Aug. 19, 1969   A. M. CARTER   3,462,169
COMBINED LOAD LEVELER AND OVERLOAD DEVICE
Filed Oct. 16, 1967
FIG. 1.
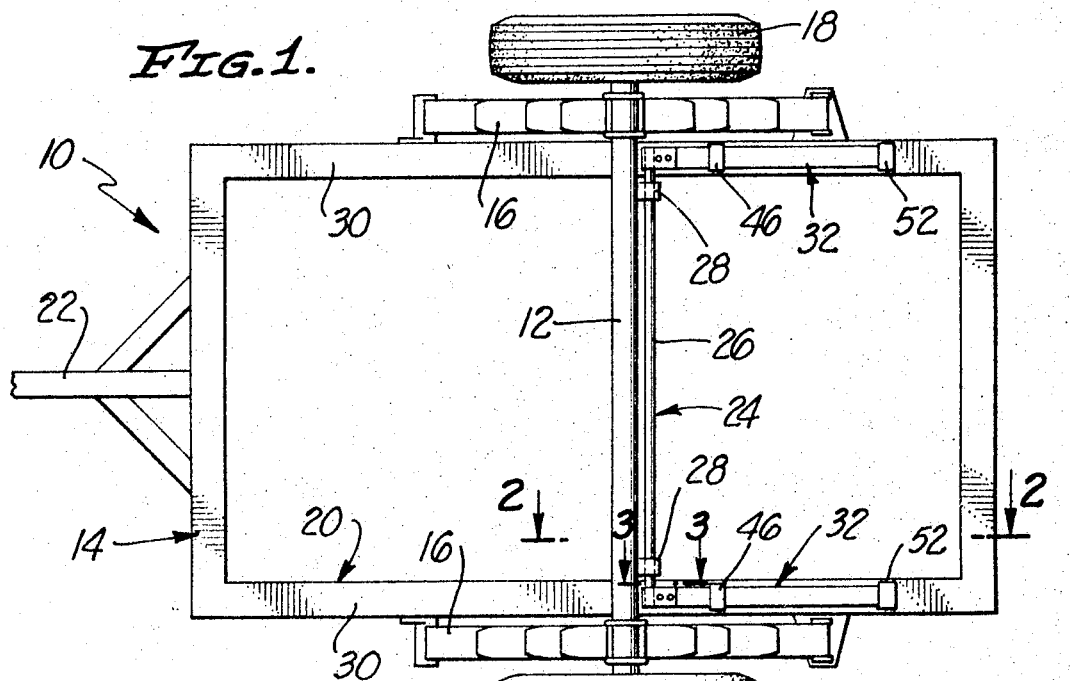
FIG. 2.
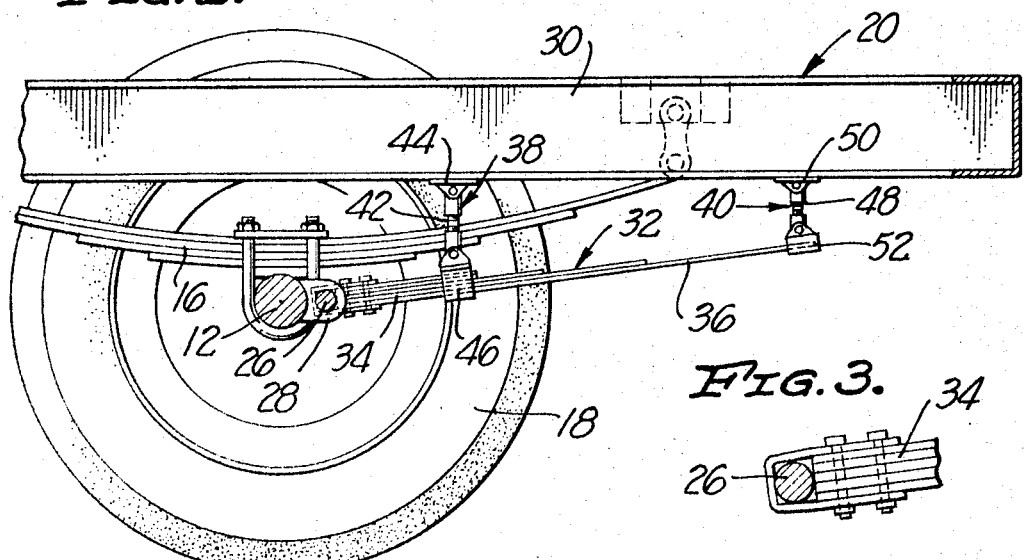
FIG. 3.
FIG. 4.
INVENTOR
ALFRED M. CARTER
BY
ATTORNEY

United States Patent Office 3,462,169
Patented Aug. 19, 1969

3,462,169
COMBINED LOAD LEVELER AND OVERLOAD DEVICE
Alfred M. Carter, 733 Norumbega Drive, Monrovia, Calif. 91016
Filed Oct. 16, 1967, Ser. No. 675,504
Int. Cl. B62d *37/00;* B60g *21/00, 11/34*
U.S. Cl. 280—124
7 Claims

ABSTRACT OF THE DISCLOSURE

A combined leveling and overload device for a vehicle having an axle and a chassis resiliently supported on the axle, the device including a torque shaft extending lengthwise of and pivotally supported on the axle, arms extending laterally from the ends of the shaft toward one end of the chassis and having relatively stiff inner arm sections adjacent the shaft and relatively resilient outer arm sections, whereby the arms have junctures between the arm sections and outer free ends, and means operatively connecting the chassis to the junctures and free ends, respectively, of the arms in such a way that the torque shaft and inner arm sections constitute a load leveling device for the chassis and the outer arm sections constitute overload springs.

BACKGROUND OF THE INVENTION

*Field of the invention.*—This invention relates generally to wheeled vehicles. More particularly, the invention relates to a combined leveling and overload device for such vehicles.

*Prior art.*—A wide variety of leveling and overload devices have been devised for wheeled vehicles. Typical devices of this type, for example, are disclosed in prior art Patents Nos. 1,866,958; 1,915,134; 2,089,263; 2,059,-827; 2,300,237; and 3,292,918. Leveling devices of this kind are constructed and arranged to maintain the vehicle chassis in parallel relation to the vehicle axle under nonuniform load conditions and thereby prevent swaying and rolling of the chassis. Overload devices, on the other hand, are designed to reinforce the spring suspension system of such vehicles to increase the load carrying capacity of the vehicles. The existing devices of the kind under discussion are characterized by their essentially single function construction. That is to say, the existing leveling devices provide only a load leveling function, while the existing overload devices provide only a spring reinforcing action.

SUMMARY OF THE INVENTION

The present invention provides improved leveling and overload means for wheeled vehicles, particularly travel trailers and the like. A unique feature of the invention resides in the multiple function construction of the present leveling and overload means. That is to say, the invention provides a combined leveling and overload device for wheeled vehicles which serves the dual function of maintaining the vehicle chassis level under nonuniform load conditions, thereby to prevent lateral rolling and swaying of the vehicle, and reinforcing the vehicle suspension springs, thus to increase the normal load carrying capacity of the vehicle. To this end, the present overload device has a torque shaft which extends lengthwise of and is pivotally supported on the vehicle axle and arms extending laterally from the ends of the shaft and longitudinally of the vehicle. These arms have relatively stiff inner end sections adjacent the shaft and outer relatively resilient end sections. Hanger means are provided for operatively connecting the vehicle chassis to the arms at the junctures of their respective inner and outer arm sections and to the free ends of the arms.

When the present device is installed on a vehicle, the torque shaft and the relatively stiff inner arm sections of the device constitute, in effect, a load leveler. Thus, relative vertical displacement of either side of the vehicle chassis relative to the axle, as a result of nonuniform loading of the chassis, produces a moment on the adjacent arm of the device which is transmitted through the torque shaft to the opposite arm. This arm, then, produces on the adjacent side of the chassis a force in a direction to cause the latter side of the chassis to follow the vertical movement of the opposite side of the chassis. Moreover, during such relative displacement of the vehicle chassis and axle, the resilient outer end sections of the arms are bent or deflected. This bending of the outer arm sections produces on the vehicle chassis a spring force which resists the relative displacement of the chassis and axle and thereby aids or reinforces the suspension springs of the vehicle. Thus, the combined load leveler and overload device of the invention provides the dual function of maintaining the vehicle chassis level under nonuniform conditions and reinforcing the vehicle suspension springs.

BRIEF DESCRIPTION OF THE DRAWINGS

FIGURE 1 is a bottom plan view of a wheeled vehicle equipped with a combined leveling and overload device according to the invention;

FIGURE 2 is an enlarged section taken on line 2—2 in FIGURE 1;

FIGURE 3 is an enlarged section taken on line 3—3 in FIGURE 1; and

FIGURE 4 is a fragmentary view similar to FIGURE 2 illustrating the vehicle in another condition of loading.

Referring now to these drawings, there is illustrated a vehicle 10 having an axle 12, a chassis 14 over the axle, and suspension springs 16 supporting the chassis on the ends of the axle. In this case, the suspension spring 16 are leaf springs which are attached at their center to the axle and at their ends to the chassis. Rotatably mounted on the outboard ends of the axle are wheels 18. As will appear from the ensuing description, the combined leveling and overload device of the invention may be employed to advantage on a variety of vehicles. The particular vehicle illustrated is a trailer, the chassis 14 of which comprises a rectangular frame 20. Rigidly secured to and extending forwardly from the front end of this frame, on the longitudinal center line of the vehicle, is a hitch tongue 22 for connection to a towing vehicle (not shown). As is common practice in trailers of this type, the axle 12 is located a short distance to the rear of the transverse center line of the vehicle chassis 14.

The combined leveling and overload device of the invention is designated in its entirety in the drawings by the reference numeral 24. This device comprises a torque shaft 26 extending along the axle 12. In this instance, the torque shaft is located at the rear side of the axle. Torque shaft 26 is rotatably supported on the axle 12 by bearings 28. In the particular leveling and overload device 24 illustrated, the bearings 28 are secured to the axle 12 just inboard of the longitudinal members 30 of the chassis frame 20. The ends of the torque shaft 26 extend beyond the bearings and underlie the frame members 30.

Secured to and extending laterally from the outboard ends of the torque shaft 26 toward one end, in this instance the rear end, of the vehicle chassis 14, are a pair of arms 32. Referring particularly to FIGURES 2 and 4, it will be seen that each arm 32 has a relatively stiff inner end section 34 adjacent the torque shaft 26 and a relatively resilient outer end section 36 remote from the torque shaft. Thus, each arm 32 has a juncture between its inner and outer arm sections 34, 36 and an outer free end.

According to the present invention, the combined leveling and overload device 24 is equipped with a pair of inner hangers 38 for attaching the junctures of the inner and outer arm sections 34, 36 to the vehicle chassis 14 and outer hangers 40 for attaching the free ends of the arms 32 to the chassis. Various types of hangers may be utilized for this purpose. The particular inner hangers 38 illustrated comprise longitudinally adjustable links 42 the ends of which are pivotally attached to brackets 44 and 46, respectively. The hanger brackets 44 are welded or otherwise rigidly secured to the under side of the longitudinal chassis frame members 30. The hanger brackets 46 are attached to the arms 32. The outer hangers 40 are similar in construction and include longitudinally adjustable links 48 having pivoted brackets 50 and 52 at their ends. The hanger brackets 50 are welded to the longitudinal frame members 30. The hanger brackets 52 are attached to the free ends of the arms 32.

It is obvious that the arms 32 of the present leveling and overload device 24 may be constructed in various ways. The particular arms illustrated comprise leaf spring assemblies. The inner end sections 34 of these assemblies comprise a relatively large number of stiff spring leaves. The outer arm sections 36 comprise a relatively small number of resilient spring leaves. The inner arm sections 34 are relatively short in length, and, preferably, substantially shorter than one-half the overall length of the arms 32, as shown.

The hangers 38, 40 of the present leveling and overload device 24 are adjusted in such a way that under normal load conditions on the vehicle 10, the vehicle springs 16 and the arms 32 of the leveling and overload device 24 assume the positions illustrated in FIGURE 2. Under normal load conditions, then, the arms of the device are substantially unstressed. Assume now that the vehicle chassis 14 is subjected to a nonuniform loading condition which tends to vertically displace the vehicle chassis 14 in one direction relative to the vehicle axle 12. Assume, for example, that one side of the chassis is displaced downwardly relative to the axle, as shown in FIGURE 4. When this occurs, a downward or clockwise moment is exerted on the adjacent inner arm section 34 of the leveling and overload device. This moment is transmitted through the torque shaft 26 to the inner arm section 34 at the opposite side of the chassis. A downward force is thereby exerted on the latter side of the chassis which causes a downward displacement of this side substantially equal to the downward displacement of the first mentioned side of the chassis produced by the unbalanced load conditions on the chassis. A similar action occurs in the event that one side of the chassis undergoes upward displacement relative to the axle. Accordingly, the torque shaft 26 and inner arm sections 34 of the present device 24 function as a load leveler which maintains the vehicle chassis 14 level, i.e., parallel to the vehicle axle 12, under unbalanced load conditions.

Referring again to FIGURE 4, it will be observed that during the above described downward displacement of the vehicle chassis 14 relative to the axle 12, the resilient outer ends 36 of the arms 32 of the combined leveling and overload device 24 are bent or deflected in such a way as to resist the relative displacement of the chassis with respect to the axle. A similar action occurs in the event that the relative displacement of the chassis is in the upward direction. Accordingly, the outer arm ends 36 of the device 24 function as overload springs which assist or reinforce the vehicle suspension springs 16. Referring to FIGURES 2 and 4, it will be observed that the shorter the length of the inner arm sections 34, the greater will be the distortion or flexing of the outer arm sections 36 during relative displacement of the chassis 14 relative to the axle 12. This results in more tension and force in the outer spring end sections and, therefore, greater reinforcing action of these ends on the main vehicle suspension springs 16.

Those versed in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art.

The inventor claims:

1. In a vehicle having an axle, a chassis over said axle, and suspension springs resiliently supporting said chassis on the end of said axle, combined leveling and overload means comprising:
    a torque shaft extending along said axle,
    means pivotally supporting said shaft on said axle,
    arms rigidly joined at one end to said shaft and extending laterally from said shaft toward one end of said chassis,
    said arms having relatively stiff inner end sections adjacent said shaft and relatively resilient outer end sections remote from said shaft,
    inner hanger means operatively connecting said chassis to said arms adjacent the junctures of said arm sections, respectively, and
    outer hanger means operatively connecting said chassis to the free ends of said arms, whereby said torque shaft and inner arm sections together constitute a load leveling device for maintaining said chassis parallel to said axle under unbalanced load conditions, and said outer arm sections constitute overload springs for reinforcing said vehicle suspension springs.

2. Vehicle leveling and overload means according to claim 1 wherein:
    said hanger means comprise links pivotally connected between said chassis and arms, respectively.

3. Vehicle leveling and overload means according to claim 2 wherein:
    said links are longitudinally adjustable.

4. Vehicle leveling and overload means according to claim 1 wherein:
    said arms comprise leaf spring assemblies each having a number of overlapping spring leaves,
    said inner arm sections are relatively short and composed of a number of relatively stiff spring leaves, and
    said outer arm sections are relatively long and comprise flexible spring leaves.

5. A combined leveling and overload device for a vehicle comprising:
    a torque shaft,
    bearings rotatable on said shaft for securing said shaft to a vehicle axle,
    arms rigidly joined at one end to and extending laterally of said shaft,
    said arms having relatively stiff inner end sections adjacent said shaft and relatively resilient outer end sections remote from said shaft,
    inner hanger means operatively connected to said arms at the junctures of said inner and outer sections, respectively, for attaching said junctures to the chassis of said vehicle, and
    outer hanger means operatively connected to the free ends of said arms, respectively, for attaching said free arm ends to said chassis.

6. A combined leveling and overload device according to claim 5 wherein:
    said arms comprise leaf spring assemblies,
    said inner arm sections are relatively short and include a number of relatively stiff spring leaves joined to one another, and said outer arm sections are relatively long and include flexible spring leaves.

7. A leveling and overload device according to claim 6 wherein:

said hanger means comprise longitudinally adjustable links pivotally connected at one end to said arms, respectively, and mounting pivotal brackets at their opposite ends for connection to said chassis.

References Cited

UNITED STATES PATENTS

| 2,220,217 | 11/1940 | Correa | 267—11 |
| 2,692,770 | 10/1954 | Nallinger et al. | 267—11 X |
| 3,165,332 | 1/1965 | Barker et al. | 280—124 |

A. HARRY LEVY, Primary Examiner